United States Patent
Kim et al.

(10) Patent No.: US 9,492,813 B2
(45) Date of Patent: Nov. 15, 2016

(54) METHOD FOR REGENERATING HYDROGENATION CATALYST

(71) Applicant: LG CHEM, LTD., Seoul (KR)

(72) Inventors: Dae Chul Kim, Daejeon (KR); Sung Shik Eom, Daejeon (KR); Dong-Hyun Ko, Daejeon (KR); Moo Ho Hong, Daejeon (KR); O Hak Kwon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/958,243

(22) Filed: Aug. 2, 2013

(65) Prior Publication Data
US 2013/0316893 A1    Nov. 28, 2013

Related U.S. Application Data

(63) Continuation of application No. PCT/KR2012/007470, filed on Sep. 18, 2012.

(30) Foreign Application Priority Data

May 25, 2012    (KR) .................. 10-2012-0056040

(51) Int. Cl.
| | |
|---|---|
| *B01J 23/96* | (2006.01) |
| *B01J 23/94* | (2006.01) |
| *B01J 38/10* | (2006.01) |
| *B01J 23/46* | (2006.01) |
| *B01J 23/755* | (2006.01) |
| *C10G 3/00* | (2006.01) |

(52) U.S. Cl.
CPC .............. *B01J 23/96* (2013.01); *B01J 23/464* (2013.01); *B01J 23/755* (2013.01); *B01J 23/94* (2013.01); *B01J 38/10* (2013.01); *C10G 3/45* (2013.01); *C10G 3/47* (2013.01); *C10G 3/50* (2013.01); *C10G 3/62* (2013.01); *Y02P 30/20* (2015.11)

(58) Field of Classification Search
CPC ................ B01J 23/96; B01J 23/464; B01J 23/755; B01J 23/94; B01J 38/10; C10G 3/45; C10G 3/47; C10G 3/50; C10G 3/62
USPC ....................................... 502/20–56
See application file for complete search history.

(56) References Cited

U.S. PATENT DOCUMENTS

| | | | |
|---|---|---|---|
| 6,586,636 B2 * | 7/2003 | Kelly ............................ | 568/463 |
| 7,939,694 B2 * | 5/2011 | Hong et al. .................. | 568/451 |
| 2003/0176720 A1 | 9/2003 | Bunel et al. | |

(Continued)

FOREIGN PATENT DOCUMENTS

| | | | | |
|---|---|---|---|---|
| CN | 1653038 A | | 8/2005 | |
| CN | 101376115 | * | 3/2009 | ............. B01J 38/10 |

(Continued)

*Primary Examiner* — Jennifer A Smith
(74) *Attorney, Agent, or Firm* — Dentons US LLP

(57) ABSTRACT

Disclosed is a method for regenerating a hydrogenation catalyst. More specifically, disclosed is a method for regenerating a hydrogenation catalyst poisoned during hydrogenation of a hydroformylation product for preparation of alcohol by stopping hydrogenation in a hydrogenation stationary phase reactor in which the hydrogenation catalyst is set and flowing hydrogen gas under a high temperature normal pressure. The method has an effect in that the poisoned hydrogenation catalyst can be efficiently recovered through a simple process.

2 Claims, 2 Drawing Sheets

(56) References Cited

U.S. PATENT DOCUMENTS

2010/0312005 A1* 12/2010 Van Driessche et al. ...... 560/99
2011/0282108 A1* 11/2011 Ko et al. ...................... 568/883

FOREIGN PATENT DOCUMENTS

| JP | 05-279282 | 10/1993 |
| JP | 07-196550 | 8/1995 |
| JP | 2010-253478 | 11/2010 |
| KR | 10-2011-0084567 | 7/2011 |
| WO | 2011-028180 | 3/2011 |

* cited by examiner

METHOD FOR REGENERATING HYDROGENATION CATALYST

This application is a Continuation Bypass of International Application No. PCT/KR2012/007470 filed Sep. 18, 2012, and claims the benefit of Korean Application No. 10-2012-0056040 filed on May 25, 2012 all of which are hereby incorporated by reference in their entirety for all purposes as if fully set forth herein.

BACKGROUND OF THE INVENTION

Field of the Invention

The present invention relates to a method for regenerating a hydrogenation catalyst. More specifically, the present invention relates to a method for regenerating a hydrogenation catalyst poisoned during hydrogenation of a hydroformylation product for preparation of alcohol by stopping hydrogenation in a hydrogenation stationary phase reactor in which the hydrogenation catalyst is set and flowing hydrogen under a high temperature normal pressure.

Description of the Related Art

A process for preparing saturated aldehyde having a structure in which hydrogen and a formyl group (—CHO) are added to a C=C bond by reacting olefin, carbon monoxide and hydrogen in the presence of a catalyst is well-known as a "hydroformylation reaction" or "oxo reaction". Generally, subsequently, the produced aldehyde is condensed and then hydrogenated to synthesize alcohol having a loner chain. Preparation of octanol(2-ethylhexanol) from propylene using a rhodium-based catalyst is a representative example of hydroformylation.

Examples of the hydrogenation process include hydrogenation of aldehyde to alcohol, hydrogenation of ketone to secondary alcohol, hydrogenation of nitrite to primary amine, hydrogenation of alkylester of aliphatic monocarboxylic acid to alkanol, hydrogenation of alkylester of aliphatic dicarboxylic acid to aliphatic diol and the like.

Preparation of the corresponding alcohol through hydrogenation of aldehyde is already known and is widely used on an industrial scale. Examples of the preparation include a process for preparing n-butanol by bulk-hydrogenating n-butyl aldehyde synthesized from propylene through an oxo process, and a process for preparing 2-ethylhexanol used as a plasticizer by aldol-condensation of butylaldehyde to obtain 2-ethyl-3-hydroxyhexanal, dehydrogenating the 2-ethyl-3-hydroxyhexanal to obtain 2-ethylhexanal and reducing the 2-ethylhexanal and the like.

The hydrogenation reaction of aldehyde to prepare the corresponding alcohol is carried out by passing a vapor-phase stream comprising aldehyde and a hydrogen-containing gas through a catalyst phase. Typical hydrogenation conditions depend on properties of hydrogenation reaction and activity of selected hydrogenation catalyst.

The hydrogenation reaction is generally carried out using a continuous stirred tank reactor (CSTR) filled with a nickel or copper based hydrogenation catalyst, and examples thereof include hydrogenation in a vapor phase formed by evaporating aldehyde as a starting material, and hydrogenation in a liquid-phase of aldehyde that is introduced as a starting material into a reactor.

However, these hydrogenation methods have problems in that gas-liquid contact is not favorable in the process of hydrogenation reaction, thus deteriorating reaction efficiency, undesired side reactions such as esterification, acetalization and etherification occur, selectivity of hydrogenation reaction is deteriorated, and satisfactory alcohol products cannot be obtained at a high yield when by-products of the side reaction are not separated or removed during separation and purification processes.

Also, hydrogenation of aldehyde is generally performed using a single catalyst such as nickel or copper, these hydrogenation catalysts are poisoned by a substance such as phosphorous or acid and activity is thus decreased. In particular, when Rh/TPP is used as a catalyst for hydroformylation to prepare aldehyde, a small amount of TPP may remain in the produced aldehyde, and may disadvantageously poison the catalyst and deteriorate selectivity, when is introduced into a hydrogenation reaction.

According to the related art, the poisoned catalyst can be regenerated by removing the poison through high-temperature treatment in the presence of oxygen or extracting the poison with an acid. For this purpose, inconveniently, the catalyst isolated from the reactor should be subjected to additional treatment, followed by re-filling, or a line for a substance having the risk of explosion such as oxygen or air should be mounted in the hydrogenation reactor.

EXPLANATIONS OF MARKS ABOUT MAIN PARTS OF FIGURES

300: hydrogenation reaction member
321: hydrogenation reactor
322: feeder for aldehyde and hydrogen gas
323: hydrogenation catalyst layer
324: reactor outlet
325: line for supplying aldehyde and hydrogen
326: line for discharging reaction product

SUMMARY OF THE INVENTION

Therefore, the present invention has been made in view of the above problems, and it is an object of the present invention to provide a method for regenerating a hydrogenation catalyst poisoned during hydrogenation reaction of a hydroformylation product, in which, when a hydrogenation catalyst used for hydrogenation of aldehyde that is poisoned and is deteriorated in activity during hydrogenation reaction of the hydroformylation product, activity of the catalyst is effectively recovered in a simple manner and alcohol can be obtained at a high yield.

In accordance with an aspect of the present invention, the above and other objects can be accomplished by the provision of a method for regenerating a hydrogenation catalyst comprising: supplying a hydroformylation reaction product and a hydrogen gas to a hydrogenation reactor in which a hydrogenation catalyst is set (first step); stopping the hydrogenation reaction when an aldehyde conversion ratio calculated from an aldehyde supply amount and an aldehyde decrease amount measured during hydrogenation reaction is lower than 99.5% (second step); and further supplying a hydrogen gas to the hydrogenation reactor to regenerate the catalyst (third step).

Hereinafter, the present invention will be described in detail.

Technical features of the present invention are to find factors that most greatly affect poisoning of hydrogenation catalyst and to provide a method for most effectively regenerating a hydrogenation catalyst taking into consideration these factors.

That is, the present inventors demonstrated through the following examples that the factor that most greatly causes poisoning of hydrogenation catalysts is a hydroformylation reaction catalyst among hydroformylation reaction products introduced into the reactor, in which a hydrogenation catalyst is set.

Accordingly, the present inventors found effects of hydroformylation reaction catalyst on aldehyde conversion ratio and a method for regenerating a hydrogenation catalyst, comprising supplying a hydroformylation reaction product, and hydrogen gas to a hydrogenation reactor in which a hydrogenation catalyst is set (first step); stopping the hydrogenation reaction when an aldehyde conversion ratio calculated from an aldehyde supply amount and an aldehyde decrease amount measured during hydrogenation reaction is lower than 99.5% (second step); and further supplying a hydrogen gas to the hydrogenation reactor to regenerate the catalyst (third step).

The hydrogenation catalyst used in the present invention refers to a catalyst that includes, but is not limited to, a nickel catalyst or a platinum catalyst, used for hydrogenation of a hydroformylation reaction product to alcohol. Also, any hydrogenation reactor used in the present invention may be used without particular limitation so long as it can set a hydrogenation catalyst. For example, the hydrogenation reactor may be selected from a continuous stirred tank reactor (CSTR), a venturi loop reactor and a trickle bed reactor.

In particular, as can be seen from the following examples, in the first step, an inlet temperature of the hydrogenation reactor is preferably within the range of 65 to 85° C. in terms of conversion ratio of aldehyde described below (see graph of FIG. 3).

Also, in the first step, the hydroformylation reaction product is supplied at a line speed of 0.5 to 5 m/sec to the hydrogenation reactor and the hydrogenation reaction is carried out at a temperature 50 to 300° C., at a pressure of 1 to 100 bar and at a molar ratio of aldehyde (hydroformylation reaction product) to hydrogen gas of 1:1 to 10:1.

The present invention is characterized in that, in the third step, hydrogen gas is supplied at a line speed of 0.5 to 3 m/sec to the hydrogenation reactor. The reason for this is that an excessively high hydrogen flow rate is unnecessary, since the third step can be sufficiently accomplished by recovering activity of the poison catalyst at a high temperature and at a normal pressure, while flowing a hydrogen gas at an amount similar to the condition used for hydrogenation reaction. For example, a line speed of 0.5 to 1 m/sec is preferred.

Also, the third step is preferably carried out at a high temperature of 140 to 220° C. and a normal pressure of 1 to 2 bar. The high temperature condition is determined taking into consideration activity recovery of catalyst, which is 40 to 220° C., for example 180 to 200° C. Also, when the reaction temperature increases during hydrogenation reaction, a speed of poisoning (inactivation) of hydrogenation catalyst can be advantageously delayed through a TPP-based hydroformylation catalyst (see Experimental Example 3). Also, the normal pressure condition is set taking into consideration reaction efficiency, which is for example about 1 bar.

Advantageously, the third step is performed for at least 5 hours or longer under the aforementioned conditions to sufficiently regenerate the hydrogenation catalyst, and the first step is repeated to effectively regenerate the hydrogenation catalyst during hydrogenation.

Also, the aldehyde conversion ratio is suggested as a parameter, indicating a degree of hydrogenation catalyst poisoned by the hydroformylation reaction product. The aldehyde conversion ratio may be calculated by the following equation, but the present invention is not limited thereto.

Aldehyde conversion ratio (%)=aldehyde decrease amount/aldehyde supply amount×100 [Equation 1]

In particular, the aldehyde conversion ratio, suggesting the time at which the hydrogenation reaction stops in the present invention is preferably 99.9%, more preferably 99.95%. When the aldehyde conversion ratio is lower than the defined level, aldehyde cannot be converted into alcohol any more. This means that poisoning of the hydrogenation reaction catalyst is considerable.

The hydroformylation reaction catalyst that is found to most greatly affect poisoning of hydrogenation catalyst means a catalyst commonly used for hydroformylation reaction such as triphenylphosphine (TPP) or triphenylphosphine oxide (TPPO), and the present is not limited to these catalyst.

Also, the term "aldehyde" used herein refers to at least one selected from the group consisting of formaldehyde, acetaldehyde, propionaldehyde, n-butylaldehyde, isobutylaldehyde, n-valeraldehyde, iso-valeraldehyde, n-hexaaldehyde, n-heptaaldehyde, n-octanal, 2-ethylhexanal, 2-ethylhexenal(ethylpropylacrolein), n-decanal, 2-ethylbutanal, propargylaldehyde, acrolein, glyoxal, crotonaldehyde, furfural, aldol, hexahydrobenzaldehyde, alpha-citronellal, citral, cloral, trimethylacetaldehyde, diethylacetaldehyde, tetrahydrofurfural, phenylacetaldehyde, cinnamaldehyde, hydrocinnamaldehyde and a mixture thereof, but the aldehyde is not limited to these substances.

The reaction mixture left in the hydrogenation stationary-phase reactor after separation of alcohol from the reaction mixture may be supplied to the hydrogenation reactor again.

Hereinafter, the present invention will be described in detail with reference to the annexed drawings.

FIG. 1 illustrates an aldehyde hydrogenation reactor of according to one embodiment of the present invention. For reference, various standard apparatuses such as valves, temperature meters and pressure controllers practically used in plants, that those skilled in the art can easily appreciate, are omitted in FIG. 1. As shown in FIG. 1, the hydrogenation reaction member 300 may include a feeder 322 to simultaneously supply a liquid-phase aldehyde and a gas-phase hydrogen gas into a hydrogenation reactor 321; a hydrogenation catalyst layer 323; and a reactor outlet 324 disposed in the lower part of the reactor to discharge a hydrogenation reaction mixture. The feeder 322 is preferably provided in the upper part of the inside of the hydrogenation reactor 321.

That is, aldehyde and hydrogen that are simultaneously supplied into the hydrogenation reactor 321 pass through the hydrogenation catalyst layer, for example, the nickel catalyst layer 323, fixed in the hydrogenation reactor 321, and, at the same time, the hydrogen is added to aldehyde to produce a reaction mixture. The reaction mixture is a slurry comprising, the target substance, alcohol (for example, 2-ethylhexanol), as well as non-converted aldehyde, reaction by-products and the like.

The aldehyde used as a starting material in the present invention preferably contains 1 to 20 carbons and one or more aldehyde groups. Specifically, as described above, the aldehyde may be formaldehyde, acetaldehyde, propionaldehyde, n-butylaldehyde, isobutylaldehyde, n-valeraldehyde, iso-valeraldehyde, n-hexaaldehyde, n-heptaaldehyde, n-octanal, 2-ethylhexanal, 2-ethylhexenal(ethyl propyl acrolein), n-decanal, 2-ethylbutanal, propargyl aldehyde, acrolein, glyoxal, crotonaldehyde, furfural, aldol, hexahydrobenzaldehyde, alpha-citronellal, citral, cloral, trimethylacetaldehyde, diethylacetaldehyde, tetrahydrofurfural, phenylacetaldehyde, cinnamaldehyde, hydrocinnamaldehyde, a mixture thereof or the like.

The diameter of the feeder provided in the hydrogenation reactor depends on the size of the reactor or flow rate is preferably about 1 to about 500 mm. The aldehyde is supplied at a speed of about 0.5 to 5 m/sec into the hydrogenation reactor. When aldehyde is supplied at a constant speed, the hydrogen is also supplied into hydrogenation reactor. A molar ratio of aldehyde and hydrogen that are supplied into the hydrogenation reactor is preferably 1:1 to 10:1. The hydrogenation reaction is carried out at a temperature of 50 to 300° C. and at a pressure 1 to 100 bar.

Also, although a continuous stirred tank reactor (CSTR) may be used, it is preferable to use a continuous reactor equipped with a venturi, since gas-liquid contact is favorable during the hydrogenation process and reaction efficiency can be further improved.

The hydrogenation reaction recycles a product (reaction mixture) as a reactant (starting material) through a circulation slurry reactor. The reaction mixture collected from the lower part of the hydrogenation reactor is a slurry that comprises alcohol as well as non-converted aldehyde, reaction by-products and the like.

Alcohol, target substance, is separated from the reaction mixture using a filter. Separation of alcohol as the target substance from the reaction mixture can be accomplished through a filter such as a membrane filter. The slurry that remains after separation of alcohol from the reaction mixture is supplied through a nozzle provided in the upper part of the hydrogenation reactor back into hydrogenation reactor.

At this time, when a measured aldehyde conversion ratio is lower than 99.5%, supply of aldehyde into the hydrogenation stationary phase reactor is stopped and hydrogen gas is flowed therein, to recover activity of the hydrogenation reaction catalyst poisoned by the hydroformylation product, in particular, hydroformylation catalyst at a high temperature and a normal pressure. The regeneration time is preferably at least 5 hours since activity of catalyst can be sufficiently recovered.

Also, as can be seen from the following examples, when the hydrogenation reactor inlet temperature is 50° C., the conversion ratio decreases to 30%, on the other hand, when the reactor inlet temperature is 80° C., the conversion ratio decreases to about 95% for a predetermined period of time. This means that the inlet temperature is preferably specified within this range.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the present invention will be described in more detailed with reference to the following examples. However, these examples are provided only for illustration and should not be construed as limiting the technical scope of the present invention.

EXPERIMENTAL EXAMPLE 1

Effects of TPP on Hydrogenation Process

This example was performed to analyze effects of triphenylphosphine (TPP) generally used as a hydroformylation catalyst on the hydrogenation process and reaction testing was performed while alternating the condition in which TPP is contained in a supply tube of a hydrogenation reactor 321 and the condition in which TPP is not contained in the supply tube of the hydrogenation reactor 321.

That is, for 8 hours after reaction, testing was performed in the absence of TPP as a control group for 8 hours. Then, for 14 hours, TPP was supplied to the supply tube. At this time, the concentration of TPP in the supply tube was adjusted to 0.3% (300 ppm). The value thus measured is summarized as a graph of FIG. 2.

Figure 2:
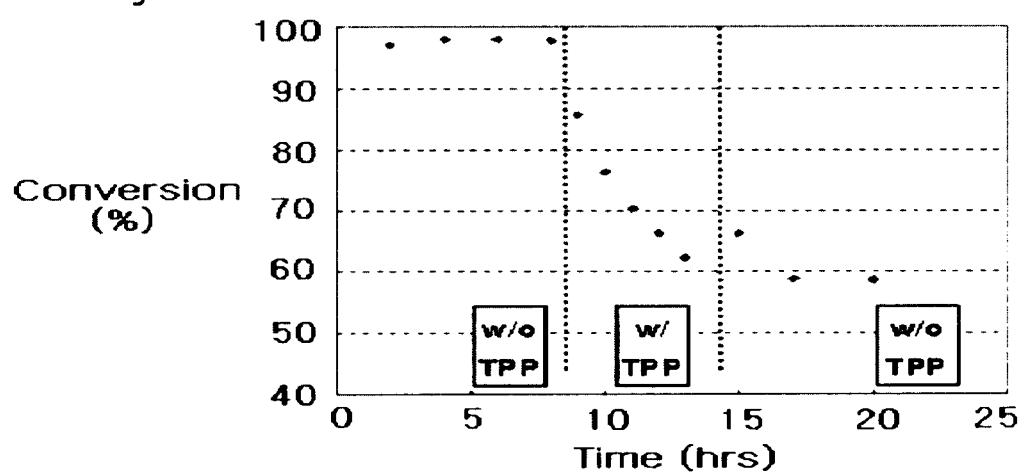
FIG. 2 is a graph showing correlation between triphenylphosphine (TPP) content and aldehyde conversion ratio during hydrogenation reaction of butylaldehyde.

As can be seen from FIG. 2, the conversion ratio was decreased to 60% within 6 hours due to supply of TPP, and initial conversion ratio was not recovered, although TPP was removed from the supply tube.

Accordingly, from these results, it can be seen that TPP acts as a poison of the BAL hydrogenation catalyst.

EXPERIMENTAL EXAMPLE 2

Regeneration Test of Hydrogenation Catalyst Poisoned by TPP

This example is an Experimental Example to confirm regeneration of catalyst inactivated by TPP by treatment with hydrogen.

Figure 1:
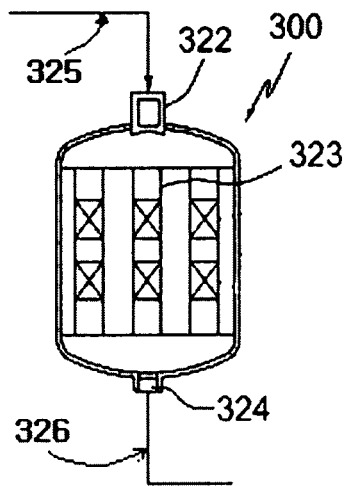
FIG. 1 is a sectional view illustrating a hydrogenation stationary phase reactor used for one embodiment of the present invention.

First, an increase in temperature was tried in a state in which flow of liquid reactant supplied into the hydrogenation reactor 321 of FIG. 1 was stopped and only hydrogen was flowed in the same amount as used during the reaction. In this case, in order to facilitate desorption of poison, the pressure was decreased to normal pressure and the reactor temperature was increased to 200° C., which was the same as the catalyst pre-treatment temperature.

The results measured at respective reaction steps are shown in Table 1 below in brief.

TABLE 1

| Test date Items | 3 days (reaction initiation early state) | 47 days (after inactivation) | 54 days (after treatment with hydrogen at 200° C.) |
| --- | --- | --- | --- |
| Unreacted BAL | 0.54 | 14.27 | 0.00 |
| BuOH yield* | 98.20 | 74.19 | 97.49 |
| Heavies** | 1.06 | 11.30 | 2.42 |
| Etc*** | 0.20 | 0.24 | 0.09 |

(LHSV = 0.4 for BAL, Tin = 50° C., P = 23 bar, $H_2$/BAL = 1.5, C(TPP) = 30 ppm)
*BuOH yield = conversion ratio × selectivity
**Dimer, Trimer
***small amount of residues As can be seen from the table above, when inactivated catalyst was treated with hydrogen at 200° C., activity and selectivity were recovered. In particular, a heavy ingredient was 11.3% after inactivation and was decreased to 2.4% after treatment with hydrogen, and the content of unreacted BAL was also not detected after treatment with hydrogen. As apparent from these results, the cause of catalyst inactivation was poisoning of a specific ingredient and TPP was the most potent poison. This could be seen from these facts that addition of TPP facilitated production of by-products such as a heavy ingredient among hydrogenation reactants and the content of the heavy ingredient in the catalyst regenerated by treatment with hydrogen was decreased.

EXPERIMENTAL EXAMPLE 3

Effects of Hydrogenation Reactor Inlet Temperature on Aldehyde Conversion Ratio Caused by Addition of TPP This example was performed to compare effects of hydrogenation reactor inlet temperatures on TPP. Testing was performed at different reactor inlet temperatures and the results thus obtained are shown as a graph of FIG. 3.

Figure 3:
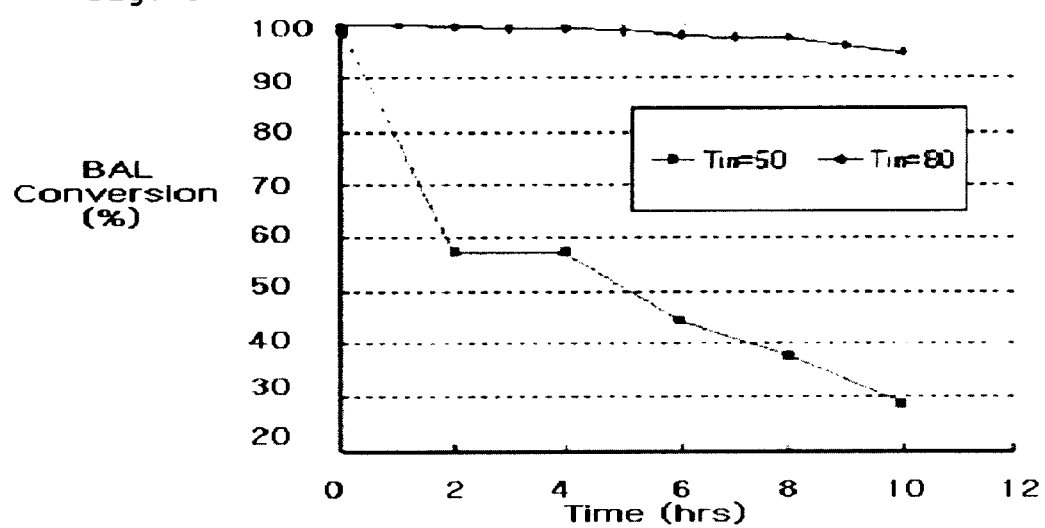
FIG. 3 is a graph showing effects of hydrogenation reactor inlet temperature on aldehyde conversion ratio during hydrogenation of butylaldehyde.

As can be seen from FIG. 3, in a case in which the reactor inlet temperature was 80° C., inactivation by TPP was much slower, as compared to a case in which the hydrogenation reactor inlet temperature was 50° C. Also, in the reaction in which the inlet temperature was 50° C., the conversion ratio was decreased to 30%, while, in the reaction in which the inlet temperature was 80° C., conversion ratio was decreased only to 95%. That is, these two cases exhibited a great difference in inactivation speed.

As apparent from the fore-going, the present invention has an effect in which, when a hydrogenation catalyst is poisoned and deteriorated in activity during hydrogenation of a hydroformylation reaction product, the activity of hydrogenation catalyst can be effectively recovered in a simple manner and alcohol can be thus obtained at a high yield.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for regenerating a hydrogenation catalyst used for hydrogenation of aldehyde to alcohol comprising a hydrogenation treatment process and a hydrogenation regeneration process carried out in one hydrogenation reactor,
   wherein the hydrogenation reactor comprises a hydrogenation reaction member including a feeder to simultaneously supply a liquid-phase aldehyde and a gas-phase hydrogen gas into the hydrogenation reactor; a hydrogenation catalyst layer; and a reactor outlet disposed in a lower part of the hydrogenation reactor to discharge a hydrogenation reaction mixture,
   wherein the hydrogenation treatment process comprises supplying butyraldehyde containing triphenylphosphine (TPP) and hydrogen gas to the hydrogenation reactor in which a nickel catalyst is fixed, setting an inlet temperature of the hydrogenation reactor in the range of 65 to 85° C., and performing a hydrogenation reaction at a temperature in the range of 180 to 200° C. to directly prepare butanol,
   wherein the hydrogenation regeneration process comprises stopping the supply of the butyraldehyde, and introducing hydrogen gas at a temperature in the range of 140 to 220° C. and 1 to 2 bar for 5 to 10 hours to the hydrogenation reactor when the conversion rate of the aldehyde measured during the hydrogenation treatment process is not more than 99.5% to regenerate the nickel catalyst poisoned by TPP, and
   wherein a yield of a produced butanol from the regenerated catalyst is 97.49% or more.

2. The method according to claim 1, wherein in the hydrogenation regeneration process the hydrogen is introduced into the hydrogenation reactor in the same amount as used during the hydrogenation reaction.

* * * * *